(12) United States Patent
Smith et al.

(10) Patent No.: US 12,187,966 B2
(45) Date of Patent: Jan. 7, 2025

(54) SELECTIVE FORMATION OF JET AND DIESEL FUELS FROM BIO-BASED C3-C8 OLEFINS VIA OLIGOMERIZATION WITH TUNGSTATED CATALYSTS

(71) Applicant: Gevo, Inc., Englewood, CO (US)

(72) Inventors: Jonathan Smith, Highlands Ranch, CO (US); Madeline Sjodin, Denver, CO (US)

(73) Assignee: Gevo, Inc., Englewood, CO (US)

( * ) Notice: Subject to any disclaimer, the term of this patent is extended or adjusted under 35 U.S.C. 154(b) by 158 days.

(21) Appl. No.: 17/734,172

(22) Filed: May 2, 2022

(65) Prior Publication Data

US 2022/0259508 A1  Aug. 18, 2022

Related U.S. Application Data

(63) Continuation of application No. PCT/US2020/059163, filed on Nov. 5, 2020.

(60) Provisional application No. 62/932,389, filed on Nov. 7, 2019.

(51) Int. Cl.
*C10G 50/00* (2006.01)
*C10G 3/00* (2006.01)
*C10L 1/08* (2006.01)

(52) U.S. Cl.
CPC ............... *C10G 50/00* (2013.01); *C10G 3/46* (2013.01); *C10G 3/49* (2013.01); *C10L 1/08* (2013.01); *C10G 2400/08* (2013.01); *C10L 2200/043* (2013.01)

(58) Field of Classification Search
CPC . C10G 50/00; C10G 3/00; C10G 3/46; C10G 3/49; C10G 2400/04; C10G 2400/08; C10G 2300/1011; C10L 1/08; C10L 2200/043; Y02E 50/10; C07C 2/04; C07C 2/06; C07C 2/08; C07C 2/10; C07C 2/12
See application file for complete search history.

(56) References Cited

U.S. PATENT DOCUMENTS

| | | | |
|---|---|---|---|
| 8,193,402 B2 * | 6/2012 | Gruber | C10L 1/06 208/15 |
| 8,362,307 B2 | 1/2013 | Cortright et al. | |
| 2010/0076233 A1 | 3/2010 | Cortright et al. | |
| 2013/0184505 A1 | 7/2013 | Maxwell | |
| 2013/0237728 A1 | 9/2013 | Lotero et al. | |
| 2013/0261323 A1 * | 10/2013 | Peters | C10G 29/205 585/329 |
| 2013/0263498 A1 | 10/2013 | Kania et al. | |
| 2013/0324777 A1 * | 12/2013 | Hanks | C10G 3/50 585/329 |
| 2015/0191666 A1 | 7/2015 | Bradin | |
| 2020/0087587 A1 | 3/2020 | D'Acosta et al. | |

FOREIGN PATENT DOCUMENTS

| | | |
|---|---|---|
| CA | 2707306 A1 | 6/2009 |
| CN | 101305076 A | 11/2008 |
| CN | 103403128 A | 11/2013 |
| CN | 110325493 A | 10/2019 |
| JP | 2004351371 A | 12/2004 |
| WO | WO-2018/071905 A1 | 4/2018 |
| WO | WO-2021/092213 A1 | 5/2021 |
| WO | WO-2021/092213 A8 | 6/2022 |

OTHER PUBLICATIONS

Extended European Seach Report received for EP Patent Application No. 20885332.5, mailed on Nov. 2, 2023, 6 pages.
Rui et al. (Dec. 31, 2016) "Progress in Catalytic Production of Jet Fuel Range Alkanes From Biomass-derivatives", Research Institute of Petroleum Processing, SINOPEC, pp. 2735-2745.
Schalkwyk et al. (Dec. 8, 2003) "Factors That Could Influence the Activity of a WO"3/siO"2 Catalyst: Part III", Applied Catalysis A: General, 255(2):143-152.
International Search Report and Written Opinion issued in International Application No. PCT/US2020/059163, mailed Feb. 4, 2021. 8 pages.

* cited by examiner

*Primary Examiner* — In Suk C Bullock
*Assistant Examiner* — Jason Y Chong
(74) *Attorney, Agent, or Firm* — Mintz, Levin, Cohn, Ferris, Glovsky and Popeo, P.C.

(57) ABSTRACT

Disclosed is a process for converting lower linear and branched mono-olefins, derived from $C_2$-$C_5$ bio-based alcohols to higher hydrocarbons, to one or more $C_8$-$C_{24}$ hydrocarbons. Certain embodiments provide a process for oligomerization of branched and/or linear $C_3$-$C_8$ olefins to renewable diesel fuel and/or jet fuel in overall yields of at least 70% in the presence of tungstated γ-alumina or tungstated silica catalysts admixed with ZSM-5 type zeolites.

16 Claims, No Drawings

SELECTIVE FORMATION OF JET AND DIESEL FUELS FROM BIO-BASED C3-C8 OLEFINS VIA OLIGOMERIZATION WITH TUNGSTATED CATALYSTS

CROSS-REFERENCES TO RELATED APPLICATIONS

This application is a continuation application, filed under 35 U.S.C. § 120, of PCT International Patent Application No. PCT/US2020/059163 with an International Filing Date of Nov. 5, 2020, and entitled "SELECTIVE FORMATION OF JET AND DIESEL FUELS FROM BIO-BASED C3-C8 OLEFINS VIA OLIGOMERIZATION WITH TUNGSTATED CATALYSTS," which claims priority to and the benefit of U.S. Provisional Patent Application No. 62/932,389 filed on Nov. 7, 2019, and entitled "SELECTIVE FORMATION OF JET OR DIESEL FUEL VIA OLIGOMERIZATION OF C3-C8 OLEFINS," each of which is incorporated by reference in its entirety for all purposes.

TECHNICAL FIELD

The subject matter described herein relates to a process for converting one or more $C_3$-$C_8$ linear or branched olefins, derived from one or more $C_2$-$C_5$ alcohols, to one or more $C_8$-$C_{24}$ hydrocarbons.

BACKGROUND

Traditionally, petroleum is use as the starting point for the synthesis of fuels. For example, the oligomerization of gaseous mono-olefins using petroleum paraffin wax to form gasoline or diesel type hydrocarbons has been carried out by using acid catalysts such as supported phosphoric acid, and olefin dimers have been generally obtained for gasoline additives after hydrogenation of the dimers. Olefin trimerization has been mainly carried out by using solid acid catalysts such as heteropoly acid, zirconia, zeolite called Al-TS-I and sulfated titania. Ionic liquids are also used for these reactions. However, these catalyst compositions can be expensive and can result in low yields.

Nickel-based heterogeneous catalysts can also be used for ethylene oligomerization to provide mixtures of $C_2$-$C_8$ olefins which are secondarily oligomerized to $C_8$-$C_{20}$ olefins. While these catalysts may be less expensive, the major products are lower level olefins and hydrocarbons, and not $C_{8+}$ oligomers for efficient production of renewable jet or diesel fuel.

In other instances, examples have been reported that utilize cation exchange resins for oligomerizing isobutene derived from petroleum. Tetramers or pentamers also could be obtained by the oligomerization of pre-formed dimers with ion exchange resins. Moreover, an ion exchange resin called Amberlyst-15 has been used in the oligomerization of isobutene. However, the conversion with the ion exchange resin was less than 40%, and dimers rather than trimers were the main products. Similarly, Amberlyst-35 ion exchange resin affords higher levels of trimers, but dimers are present in 30-40% levels.

In sum, the current processes produce oligomers in a non-selective manner by the oligomerization of $C_2$-$C_8$ olefins derived from petroleum. Such processes typically generate a mathematical distribution (Schulz-Flory or Poisson) of oligomers, which very often does not match market demand. The catalyst used can be expensive and result in low yields of the desired oligomers.

Petroleum is a nonrenewable resource and its combustion results in carbon being released into the environment. There is an increasing demand for the use of biomass sources for replacing petroleum as the starting point for the synthesis of fuels. With the increased availability and reduced cost of bioethanol, bioethanol may be an inexpensive and renewable feedstock for making a variety olefins for use producing downstream hydrocarbons. The use of biomass-derived alcohols for the synthesis of base stocks for fuels is therefore of great interest, however, the resulting bio-based olefins often require extensive purification to avoid deactivating and poisoning traditional catalysts historically used with petroleum sources.

SUMMARY

Aspects of the current subject matter relate inter alia to processes for converting one or more $C_3$-$C_8$ linear or branched olefins, derived from one or more $C_2$-$C_5$ alcohols, to one or more $C_8$-$C_{24}$ hydrocarbons.

Consistent with some aspects of the current subject matter, a process for converting one or more $C_3$-$C_8$ linear or branched olefins, derived from one or more $C_2$-$C_5$ alcohols, to one or more $C_8$-$C_{24}$ hydrocarbons is disclosed. The process includes using a catalyst comprising a tungstated alumina catalyst or a tungstated silica catalyst admixed with a zeolite catalyst. The mass yield of the $C_8$-$C_{24}$ hydrocarbons is at least 70%.

In variations, one or more of the following features may be included in any feasible combination. For example, the one or more $C_8$-$C_{24}$ hydrocarbons can be used to produce renewable jet fuel and/or renewable diesel fuel. Aromatic compounds and/or fossil-fuel derived compounds can be blended with the renewable jet fuel or renewable diesel fuel. The one or more $C_3$-$C_8$ linear or branched olefins can be one or more $C_3$-$C_6$ linear or branched olefins. The feed stream may include at least 100 ppm of oxygenates. The oxygenates may include water, $C_2$-$C_5$ alcohol, or a combination thereof. The catalyst can comprise a tungstated γ-alumina catalyst or silica catalyst admixed with zeolite catalyst. The tungstate is present in an amount of 5 wt. % to 25 wt. % of the total weight of the catalyst.

The temperature of the one reactor processes can be from 100° C. to 400° C., including all the subranges in between. The pressure can be from 200 psig to 600 psig including all subranges in between. The WHSV can be from 0.5 to 10 and all the subranges in between.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION

In the following description, certain specific details are set forth in order to provide a thorough understanding of various embodiments. However, one skilled in the art will understand that the disclosure may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed disclosure.

Reference throughout this specification to "one embodiment" or "an embodiment" means a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The word "about" when immediately preceding a numerical value means a range of plus or minus 10% of that value, e.g., "about 50" means 45 to 55, "about 25,000" means 22,500 to 27,500, etc. Furthermore, the phrases "less than about" a value or "greater than about" a value should be understood in view of the definition of the term "about" provided herein.

"Oxygenate" refers to compounds which include oxygen in their chemical structure. Examples of oxygenates include, but are not limited to water, alcohols, esters, and ethers.

"WHSV" refers to weight hourly space velocity and is defined as the weight of the feed flowing per unit weight of the catalyst per hour.

Aspects of the current subject matter overcame challenges by developing novel oligomerization processes in which linear and/or branched $C_3$-$C_8$ olefins may be oligomerized, via tungstated γ-alumina, or tungstated silica catalysts admixed with ZSM-5 type zeolites, to either diesel or jet fuel hydrocarbon fractions in yields exceeding 60% and at competitive costs. The process according to the present disclosure produces $C_{12+}$ oligomers in high selectivity, high throughput, and long catalyst life that meet or exceed diesel and/or jet fuel specifications. Those skilled in the art will recognize that in order to meet diesel fuel and/or jet fuel specifications, the appropriate balance of branched and/or linear oligomers is desirable in the oligomerization feedstock, and as such, catalysts that concurrently isomerize and/or oligomerize mixtures of branched and/or linear $C_3$-$C_8$ olefins in high yield and conversion are desired. The ability to oligomerize branched olefins, in the presence of linear olefins, increases process flexibility towards either diesel and/or jet fuel production depending on market fluctuations.

The $C_{12+}$ oligomers can be utilized directly for the production of renewable diesel fuel and renewable jet fuel post hydrogenation. Hydrogenation catalysts can be selected from any supported catalysts such as Pd/C, Pd/alumina, Pd/silica, Pd/silica-alumina, Pt/C, Pt/alumina, Pt/silica, Pt/silica-alumina, Ru/C, Ru/alumina, Ru/silica, Ru/silica-alumina, Ni/C, Ni/alumina, Ni/silica, Ni/silica-alumina.

Surprising, the oligomerization of liquefied linear $C_3$-$C_8$ olefins to diesel fractions with $WO_x$/alumina catalyst or $WO_x$/silica catalyst admixed with zeolite, which are inexpensive to manufacture from commercially available raw materials, proceeds smoothly at reaction pressures of 250-600 psig, reaction temperatures of 125-350° C., and a liquid hourly space velocity (LHSV) of 1.5-2.5 resulting in a single pass $C_3$-$C_8$ olefin conversion of at least 70% as exemplified in the examples below. Removal and recycle of the 'light' $C_3$-$C_8$ oligomer fraction provides an overall isolated diesel yield of at least 70% based on olefins fed. The $WO_x$/alumina admixed with ZSM5 catalysts are stable, and extended reaction on-stream times have been demonstrated both in the lab and at demonstration plant scale. In addition, the catalyst mixture can be regenerated via air to regain activity.

The $C_3$-$C_8$ olefin oligomerization process with $WO_x$/alumina or $WO_x$/silica admixed with ZSM5 catalysts result in high yield and selectivity to bio-based diesel or jet fuel at relatively low temperatures and pressures and tolerates high levels of oxygenates. Other known catalysts for $C_3$-$C_8$ linear olefin oligomerization (standard Zeolites, modified Zeolites, SPA's, Nafion Resins, etc.) deactivate rapidly requiring re-activation, are relatively expensive, have poor tolerance for the presence of oxygenates, and result in higher levels of oligomer cracking/isomerization as evidenced by higher levels of $C_{5-7}$ olefins and lesser amounts of isolated yields to jet and/or diesel fractions.

Bio-based isobutanol and/or ethanol conversion to olefins in high yields with significant levels of linear and branched $C_3$-$C_8$ olefins has been previously developed. The resulting $C_3$-$C_8$ olefin mixtures containing linear and branched olefins can subsequently be oligomerized utilizing, according to the present disclosure, $WO_x$/alumina, or $WO_x$/silica catalysts physically mixed with a $H^+$ ZSM-5 zeolite catalyst to renewable diesel ($C_{12}$+ fraction) and/or a jet fuel ($C_{12}$+ fraction) in overall yields of at least 70%, depending upon temperature, pressure, and flow rates (e.g. WHSV). Described is the process for producing renewable diesel and/or renewable jet fuel fractions from predominately, bio-based olefinic compounds, preferably having a Cetane number of 40 or above with regard to the diesel fraction, meets jet fuel specifications with regard to the jet fraction, and having therein no more than about 1-5% by weight of aromatics.

Disclosed herein is a process for converting one or more $C_3$-$C_8$ linear or branched olefins, derived from one or more $C_2$-$C_5$ alcohols, to one or more $C_8$-$C_{24}$ hydrocarbons. The process comprises contacting a feed stream comprising the one or more $C_3$-$C_5$ linear or branched olefins with a catalyst at a temperature from 100° C. to 400° C., a pressure from 200 psig to 600 psig, and a WHSV of at least 0.5, wherein the catalyst comprises a tungstated alumina catalyst or a tungstated silica catalyst admixed with a zeolite catalyst; and forming the one or more $C_8$-$C_{24}$ hydrocarbons, wherein a mass yield of the $C_8$-$C_{24}$ hydrocarbons is at least 70%. More specifically, the catalysts for oligomerizing the mixtures of linear and/or branched $C_3$-$C_8$ olefins can comprise 10-15 wt % tungsten loading on the alumina or silica support admixed with ZSM5 zeolites are used as catalyst combinations.

The oligomerization reaction is preferably performed in continuous mode for mass production of oligomers. The continuous mode is operated by using a fixed bed reactor, and reactant flows can be upward or downward. Use of a recycle stream consisting of oligomerized reaction product to control the heat of reaction may be useful as the oligomerization reaction can be very exothermic. Batch mode oligomerization reactions are also possible, but they tend to result in lower throughput and higher operational costs.

Higher-chained hydrocarbons, such as $C_8$-$C_{24}$ hydrocarbons, can be utilized for producing jet or diesel fuel. The present process produces higher-chained hydrocarbons in surprisingly high yields and selectivities for the production of renewable jet fuel or renewable diesel fuel. The present process can further comprise separating and/or blending the one or more $C_8$-$C_{24}$ hydrocarbons to produce a renewable jet fuel or a renewable diesel fuel. For example, the process may comprise separating the one or more $C_8$-$C_{24}$ hydrocarbons into different fractions to produce a renewable jet fuel or a renewable diesel fuel of the desired composition. The separation process may include distilling the one or more $C_8$-$C_{24}$ hydrocarbons to produce the renewable jet fuel or the renewable diesel fuel.

In some examples, the process can further comprises blending the renewable jet fuel or renewable diesel fuel. The blending process may include blending an aromatic compound or a fossil-fuel derived compound with the renewable jet fuel or renewable diesel fuel. For example, blending the one or more $C_8$-$C_{24}$ hydrocarbons can include blending an aromatic compound with the renewable jet fuel or the renewable diesel fuel to modify the viscosity, ignition temperature, or other physical and/or chemical characteristics. In another example, blending the one or more $C_8$-$C_{24}$ hydrocarbons includes blending a fossil-fuel derived compound with the renewable jet fuel or the renewable diesel fuel to modify the heat of combustion, or other chemical and/or physical characteristics.

In some examples, the present process can produce renewable diesel fuel. The renewable diesel fuel has a cetane number of 40 or more. The cetane number greater can be adjusted separating and/or blending the $C_8$-$C_{24}$ hydrocarbons. In this manner, the renewable diesel fuel can be used in a variety of applications, for example, diesel engines in small displacement automobiles or large displacement machinery.

The $C_2$-$C_5$ linear or branched alcohols useful for producing $C_3$-$C_8$ linear and branched olefin mixtures includes any $C_2$-$C_5$ linear or branched alcohol known by one of skill in the art. For example the $C_2$-$C_5$ alcohols can be one or more of ethanol, propanol, iso-propanol, 1-butanol, isobutanol, 2-butanol, tert-butanol, pentanol, 3-methyl-1-butanol, 2-methyl-1-butanol, 2,2-dimethyl-1-propanol, 3-pentanol, 2-pentanol, 3-methyl-2-butanol, or 2-methyl-2-butanol. The $C_2$-$C_5$ alcohols can be from bio-based processes, such as, but not limited to, fermentation. For example, the $C_2$-$C_5$ linear or branched alcohols are bio-based and produced by fermentative processes. The $C_2$-$C_5$ linear or branched alcohols are not derived from petroleum but are produced from renewable, bio-based sources.

The olefins described herein are any olefins composed of $C_3$ or higher carbon, preferentially branched and/or linear $C_3$-$C_8$ mixtures of unsaturated hydrocarbons, and more preferentially to be mixtures of propylene ($C_3H_6$), butenes ($C_4H_8$), pentenes ($C_5H_{10}$), and hexenes ($C_6H_{12}$) as the most suitable olefins. In some instances, the one or more $C_3$-$C_8$ linear or branched olefins is one or more $C_3$-$C_6$ linear or branched olefins. For example, the one or more $C_3$-$C_8$ linear or branched olefins is one or more $C_3$-$C_5$ linear or branched olefins. In some examples, the one or more $C_3$-$C_8$ linear or branched olefins is $C_4$ linear or branched olefins.

The one or more $C_8$-$C_{24}$ hydrocarbons can be any suitable $C_8$-$C_{24}$ hydrocarbons known by one of skill in the art. In some instances, the one or more $C_8$-$C_{24}$ hydrocarbons are one or more $C_8$-$C_{20}$ hydrocarbons. In some examples, the one or more $C_8$-$C_{24}$ hydrocarbons are one or more $C_8$-$C_{16}$ hydrocarbons.

The present process is suitable for use with a variety of feed streams to produce the higher-chained hydrocarbons.

For example, the feed stream can further comprise crude products or by-products such as fusel oils, residual alcohols, water, and a recycled feed stream of a portion of the one or more $C_8$-$C_{24}$ hydrocarbons. In another example, the feed stream can further comprise a recycle feed stream containing a portion of the one or more $C_8$-$C_{24}$ hydrocarbons. The feed stream can further comprise an oxygenate. The oxygenates described herein can comprise any oxygenates such as organic and inorganic oxygenates. For example, organic oxygenates include, but are not limited to alcohols, esters, and ethers. Inorganic oxygenates include, but are not limited to, water. The oxygenates can comprise both water and lower carbon alcohols such as $C_2$-$C_5$ alcohols. In some examples, the oxygenate is water, one or more $C_2$-$C_5$ alcohols, or a combination thereof. In one example, the oxygenate is water.

The feed stream can include at least 100 ppm of the oxygenate. For example, the feed stream comprises at least 500 ppm of the oxygenate. In another example, the feed stream comprises at least 1000 ppm of the oxygenate. In another example, the feed stream comprises at least 1500 ppm of the oxygenate. For instance, the feed stream comprises at least 2000 ppm of the oxygenate.

The feed stream can include at least 2500 ppm of the oxygenate. For example, the feed stream comprises at least 3000 ppm of the oxygenate. In some examples, the feed stream comprises at least 4000 ppm of the oxygenate. In other examples, the feed stream comprises at least 5000 ppm of the oxygenate. In another example, the feed stream comprises at least 7500 ppm of the oxygenate. In some examples, the feed stream comprises at least 10000 ppm of the oxygenate. The feed stream can include between 100 ppm to 10000 ppm of the oxygenate. The feed stream can include between 1000 ppm to 7000 ppm of the oxygenate. The feed stream can include between 2000 ppm to 7000 ppm of the oxygenate. The subsequent oligomerization of the crude olefinic streams, without purification to remove oxygenates and/or water, results in formation of renewable diesel, jet, and/or gasoline fractions in high yields. The $WO_x$/alumina, or $WO_x$/silica (10-15 wt % W) catalyst admixed with type $H^+$ ZSM-5 zeolite catalyst, provide the additional benefits of maximizing both conversion, and the extent of reaction of the olefinic mixtures to a $C_{12+}$ fraction. As required, the impregnated $WO_x$/alumina or $WO_x$/silica catalyst physically mixed with a $H^+$ ZSM-5 zeolite catalyst can be regenerated via air to regain activity. In this manner, the catalyst do not require high pressures or rigorous regeneration cycles.

Oligomerization of crude renewable $C_3$-$C_8$ olefins containing high levels of water, alcohols, and oxygenates to diesel and/or jet Fuel proceeds smoothly over $WO_x$/alumina or $WO_x$/silica catalysts physically mixed with a $H^+$ ZSM-5 Zeolite catalyst. The capital expenditure and variable cost of a commercial olefin oligomerization unit is significantly reduced by not requiring purification of the 'crude' $C_3$-$C_8$ olefin stream to remove oxygenates.

Granular or extruded catalysts are suitable for the reaction even though no specific size and morphology are mandatory. Catalyst with size greater than 0.1 mm is more suitable, and the size of 0.2-3.0 mm is most suitable for operational stability and low pressure drop.

Catalyst preparations are accomplished via incipient wetness impregnation techniques. The catalysts used in the present process compared to standard commercial catalysts is more stable compared to standard commercial catalysts. The catalysts of the present process comprises a tungstated alumina catalyst or a tungstated silica catalyst admixed with a zeolite catalyst. Consistent with some aspects of the subject matter, the catalyst is the tungstated alumina catalyst admixed with the zeolite catalyst. The alumina catalyst can be γ-alumina. In some examples, the catalyst is the tungstated silica catalyst admixed with the zeolite catalyst. The zeolite catalyst can be any suitable zeolite catalyst known by one of skill in the art. For example, the zeolite catalyst is a ZSM-5 zeolite catalyst.

The tungstate present in the alumina or silica catalyst can be in an amount of 5 wt % to 25 wt. % of the total weight of the catalyst. For example, the tungstate can be present in an amount of 10 wt. % to 20 wt. % of the total weight of the catalyst. In some examples, the tungstate is present in the amount of about 15 wt. % of the total weight of the catalyst.

The catalysts can be regenerated as necessary under suitable conditions for the processes described herein. Consistent with some aspects of the subject matter, the catalyst is regenerated in-situ in air. The catalyst can be regenerated at a temperature of 400° C. to 600° C. For example, the catalyst can be regenerated at 500° C. Consistent with some aspects of the subject matter, the catalyst is regenerated for 30 minutes to 3 hours. For example, the catalyst is regenerated for 1 to 2 hours.

The temperature for the processes described herein can be any suitable reactor temperature known by one of skill in the art. In some examples, the temperature is from 100° C. to 400° C. For example, the temperature is from 150° C. to 350° C. In some instances, the temperature is from 200° C. to 300° C. In other examples, the temperature is from 240° C. to 260° C.

The pressure for the processes described herein can be any suitable pressure known by one of skill in the art. In some examples, the pressure is from 200 psig to 600 psig. For example, the pressure is from 300 psig to 600 psig. In some instances, the pressure is from 400 psig to 600 psig. In other instances, the pressure is from 450 psig to 500 psig.

The WHSV for the processes described herein can be any suitable WHSV known by one of skill in the art. For example, the WHSV can be at least 0.5. In some examples, the WHSV is at least 1. In some instances, the WHSV is from 0.5 to 100. In other instances, the WHSV is from 1 to 50. In other examples, the WHSV is from 1 to 5.

In the processes described herein, the temperature is from 100° C. to 400° C., the pressure is from 200 psig to 600 psig, and the WHSV is at least 0.5. In some instances, the temperature is from 150° C. to 350° C., the pressure is from 300 psig to 600 psig, and the WHSV is from 0.5 to 100. In other instances, the temperature is from 200° C. to 300° C., the pressure is from 400 psig to 600 psig, and the WHSV is from 1 to 50. For example, the temperature is 240° C. to 260° C., the pressure is from 450 psig to 500 psig, and the WHSV is from 1 to 5. Consistent with some aspects of the present disclosure, the oligomerization temperature is from 100° C. to 300° C., with reaction pressures ranging from 200-600 psig, and a WHSV (weight hourly space velocity) of 0.50-100 $h^{-1}$, and more preferably 1.0-5.0 $h^{-1}$.

The olefin conversion according to the present process is higher than 60%. More preferably, the conversion is higher than 90%, because selectivity to $C_{12}^+$ olefins increases with increasing olefin conversion. If olefin conversion is too low, the formation of lower molecular weight oligomers, such as olefin dimers cannot be avoided.

The mass yield of the processes described herein can be between 60% to 99% mass yield of the $C_8$-$C_{24}$ hydrocarbons. In some instances, the mass yield of the $C_8$-$C_{24}$ hydrocarbons is at least 70%. For example, the mass yield of the one or more $C_8$-$C_{24}$ hydrocarbons can be at least 75%. In other instances, the mass yield of the one or more $C_8$-$C_{24}$ hydrocarbons is at least 85%. In some examples, the mass yield of the one or more $C_8$-$C_{24}$ hydrocarbons can be at least 90%.

Disclosed herein is a process for converting one or more $C_3$-$C_6$ linear or branched olefins, derived from one or more $C_2$-$C_5$ alcohols, to one or more $C_8$-$C_{24}$ hydrocarbons, the process comprising: contacting a feed stream comprising the one or more $C_3$-$C_6$ linear or branched olefins, with a catalyst, at a temperature from 240° C. to 360° C., a pressure from 450 psig to 500 psig, and a WHSV of from 1.95 to 4, wherein the catalyst comprises a tungstated alumina catalyst or a tungstated silica catalyst admixed with a zeolite catalyst, wherein the tungstate is present in the amount of about 15 wt. % of the total weight of the catalyst; and forming the one or more $C_8$-$C_{24}$ hydrocarbons, wherein a mass yield of the $C_8$-$C_{24}$ hydrocarbons is at least 75%. The feed stream can further comprise water.

EXAMPLES

Reactor Set-Up:

The oligomerization reaction of olefins was carried out at 110° C. to 280° C. by using a fixed bed reactor containing 2.9 g of specified catalysts and flowing the liquefied olefins downward. The flow rates of liquefied olefins were controlled by Teledyne Model 500D syringe pumps coupled with D-Series pump controllers, and the olefin flow rate was adjusted to obtain the targeted olefin WHSV (weight hourly space velocity). The reaction temperature was maintained constant via a Lindberg Blue M furnace as manufactured by Thermo-Scientific. Olefin conversion was calculated by analysis of the liquid phase reactor effluent by GC for olefin content and comparing mass accountability fed versus liquid mass collected. Catalyst screening required that mass accountabilities exceeded 90% for continued development and evaluation.

Example 1a: Tungsten Impregnated γ-Alumina Catalyst Preparation

The $WO_x$/alumina catalyst was prepared by incipient wetness technique as described. The precursor metal salts (Sigma Aldrich) were added to deionized water in an amount to produce a tungstate loading of 15 wt % upon addition to γ-Alumina as support. The impregnated $WO_x$/alumina catalyst was dried at 140° C. for 4 hr, and afterwards calcined at 550° C. for 4 hr.

Example 1b: Tungsten Impregnated Silica Catalyst Preparation

The $WO_x$/silica catalyst was prepared by incipient wetness technique as described. The precursor metal salts (Sigma Aldrich) were added to deionized water in an amount to produce a tungstate loading of 15 wt % upon addition to silica as support. The impregnated $WO_x$/silica catalyst was dried at 140° C. for 4 hr, and afterwards calcined at 550° C. for 4 hr.

Example 2

Diesel Formation—oligomerization of mixed linear butenes feed (33.3% n-butene, 33.3% cis-butene, 33.3% trans-butene) with oligomerization reactor effluent as recycle over $WO_x$/alumina catalyst (2.5 g) admixed with 0.50 g ZSM5 zeolite (Zeolyst type CBV-5524). Recycle to fresh feed mass ratio 3/1. Reaction conditions: T=260° C., WHSV=4.0, P=450 psig. >95% mass accountability (mass in/mass out), isolated 75% diesel fraction post vacuum distillation. Cetane number >40. (TS 191217-18).

Example 3

Diesel Formation—oligomerization of mixed linear butenes feed (33.3% n-butene, 33.3% cis-butene, 33.3% trans-butene) with no recycle over $WO_x$/alumina catalyst (2.5 g) admixed with 0.50 g ZSM5 zeolite (Zeolyst type CBV-5524). Reaction conditions: T=260° C., WHSV=2.0, P=450 psig. >90% Mass accountability (mass in/mass out), isolated 75% diesel fraction post vacuum distillation. Cetane number >40. (TS 191105-06).

Example 4

Diesel Formation—oligomerization of mixed $C_3$-$C_8$ olefin feed (30% propylene, 45% linear butenes (33% n-butene, 33% cis-butene, 33% trans-butene, 25% $C_5$ olefins) over $WO_x$/alumina catalyst (2.5 g) admixed with 0.50 g ZSM5 zeolite (Zeolyst type CBV-5524). Reaction conditions: T=240° C., P=500 psig, WHSV=1.95, >75% mass accountability (mass in/mass out), isolated 70% diesel fraction post vacuum distillation. Cetane number >40. (TS 200310-11)

Example 5

Diesel Formation—oligomerization of mixed $C_3$-$C_5$ olefin feed (30% propylene, 45% linear butenes (33% n-butene, 33% cis-butene, 33% trans-butene, 25% $C_5$ olefins) over $WO_x$/silica catalyst (2.5 g) admixed with 0.50 g ZSM5 zeolite (Zeolyst type CBV-5524). Reaction conditions: T=240° C., P=500 psig, WHSV=1.95, >75% mass accountability (mass in/mass out), isolated 70% diesel fraction post vacuum distillation. Cetane number >40. (TS 200316-17)

Example 6

Oligomerization Reactor Effluent: T=260° C., P=450 psig, WHSV=2.0; Catalyst Mixture: 2.5 g WOx-γ-alumina (15% W), 0.50 g ZSM5 zeolite

| % $C_4$ | % $C_5$-$C_7$ | % $C_8$ | % $C_9$-$C_{11}$ | % $C_{12}$ | % $C_{13}$-$C_{15}$ | % $C_{16}$ | % $C_{20}$ | % $C_{24}$ | % $C_{28}$ |
|---|---|---|---|---|---|---|---|---|---|
| 5.10 | 4.80 | 19.52 | 6.00 | 20.56 | 4.35 | 19.24 | 12.70 | 7.71 | 0.00 |

Example 7

Prophetic Example of Diesel Formation—oligomerization of mixed $C_3$-$C_5$ olefin feed (30% propylene, 45% linear butenes (33% n-butene, 33% cis-butene, 33% trans-butene, 25% $C_5$ olefins) over $WO_x$/silica catalyst (2.5 g) admixed with 0.50 g ZSM5 zeolite (Zeolyst type CBV-5524). Reaction conditions: T=300° C., P=400 psig, WHSV=4.5, >95% mass accountability (mass in/mass out), isolated 90% diesel fraction post vacuum distillation. Cetane number >40.

Example 8

Prophetic Example of Diesel Formation—oligomerization of mixed $C_3$-$C_5$ Olefin Feed (30% propylene, 45% linear butenes (33% n-butene, 33% cis-butene, 33% trans-butene, 25% $C_5$ olefins) over $WO_x$/silica catalyst (2.5 g) admixed with 0.50 g ZSM5 zeolite (Zeolyst type CBV-5524). Reaction conditions: T=300° C., P=550 psig, WHSV=3, >95% mass accountability (mass in/mass out), isolated 85% diesel fraction post vacuum. Cetane number >40.

The following specific examples are intended to be illustrative and should not be construed as limiting in scope of the claims.

The foregoing detailed description has been given for clearness of understanding only and no unnecessary limitations should be understood there from as modifications will be obvious to those skilled in the art.

While described in connection with specific embodiments thereof, it will be understood that the principles described herein is capable of further modifications and this application is intended to cover any variations, uses, or adaptations following, in general, the principles disclosed herein and including such departures from the present disclosure as come within known or customary practice within the art to which the technology pertains and as may be applied to the essential features hereinbefore set forth and as follows in the scope of the appended claims.

The disclosures, including the claims, figures and/or drawings, of each and every patent, patent application, and publication cited herein are hereby incorporated herein by reference in their entireties.

What is claimed is:

1. A process for oligomerizing one or more $C_3$-$C_8$ linear or branched olefins derived from one or more $C_2$-$C_5$ alcohols to one or more $C_8$-$C_{24}$ hydrocarbons, the process comprising:
    contacting a feed stream with a catalyst at a temperature from about 100° C. to about 400° C., a pressure from about 200 psig to about 600 psig, and a weight hourly space velocity (WHSV) of at least 0.5, the feed stream comprising the one or more $C_3$-$C_8$ linear or branched olefins, wherein the catalyst comprises a tungstated alumina catalyst or a tungstated silica catalyst, each admixed with a zeolite catalyst; and
    forming the one or more $C_8$-$C_{24}$ hydrocarbons, wherein a mass yield of the $C_8$-$C_{24}$ hydrocarbons is at least 70%.

2. The process of claim 1, further comprising:
    separating the one or more $C_8$-$C_{24}$ hydrocarbons to produce a renewable jet fuel or a renewable diesel fuel.

3. The process of claim 2, wherein the separating the one or more $C_8$-$C_{24}$ hydrocarbons includes distilling the one or more $C_8$-$C_{24}$ hydrocarbons to produce the renewable jet fuel or the renewable diesel fuel.

4. The process of claim 2, further comprising:
    blending the renewable jet fuel or the renewable diesel fuel.

5. The process of claim 4, wherein the blending the one or more $C_8$-$C_{24}$ hydrocarbons includes blending an aromatic compound or a fossil-fuel derived compound with the renewable jet fuel or the renewable diesel fuel.

6. The process of claim 1 wherein the one or more $C_3$-$C_8$ linear or branched olefins is one or more $C_3$-$C_6$ linear or branched olefins.

7. The process of claim 1, wherein the one or more $C_3$-$C_8$ linear or branched olefins is one or more $C_3$-$C_5$ linear or branched olefins.

8. The process of any claim 1, wherein the one or more $C_3$-$C_8$ linear or branched olefins is $C_4$ linear or branched olefins.

9. The process of claim 1, wherein the one or more $C_8$-$C_{24}$ hydrocarbons are one or more $C_8$-$C_{20}$ hydrocarbons.

10. The process of claim 1, wherein the one or more $C_8$-$C_{24}$ hydrocarbons are one or more $C_8$-$C_{16}$ hydrocarbons.

11. The process of claim 1, wherein the tungstate is present in an amount of about 5 wt. % to about 25 wt. % of the total weight of the catalyst.

12. The process of claim 1, wherein the alumina catalyst is γ-alumina.

13. The process of claim 1, wherein the zeolite catalyst is ZSM-5 zeolite catalyst.

14. The process of claim 1, wherein the catalyst is regenerated via air.

15. A process for oligomerizing one or more $C_3$-$C_6$ linear or branched olefins derived from one or more $C_2$-$C_5$ alcohols to one or more $C_8$-$C_{24}$ hydrocarbons, the process comprising:

contacting a feed stream with a catalyst at a temperature from about 240° C. to about 360° C., a pressure from about 450 psig to about 500 psig, and a weight hourly space velocity (WHSV) from about 1.95 to about 4, wherein the catalyst comprises a tungstated alumina catalyst or a tungstated silica catalyst, each admixed with a zeolite catalyst, the feed stream comprising the one or more $C_3$-$C_6$ linear or branched olefins, wherein the tungstate is present in an amount of about 15 wt. % of the total weight of the catalyst; and forming the one or more $C_8$-$C_{24}$ hydrocarbons, wherein a mass yield of the $C_8$-$C_{24}$ hydrocarbons is at least 75%.

16. The process of claim 15, wherein the feed stream further comprises water.

* * * * *